Patented Oct. 30, 1951

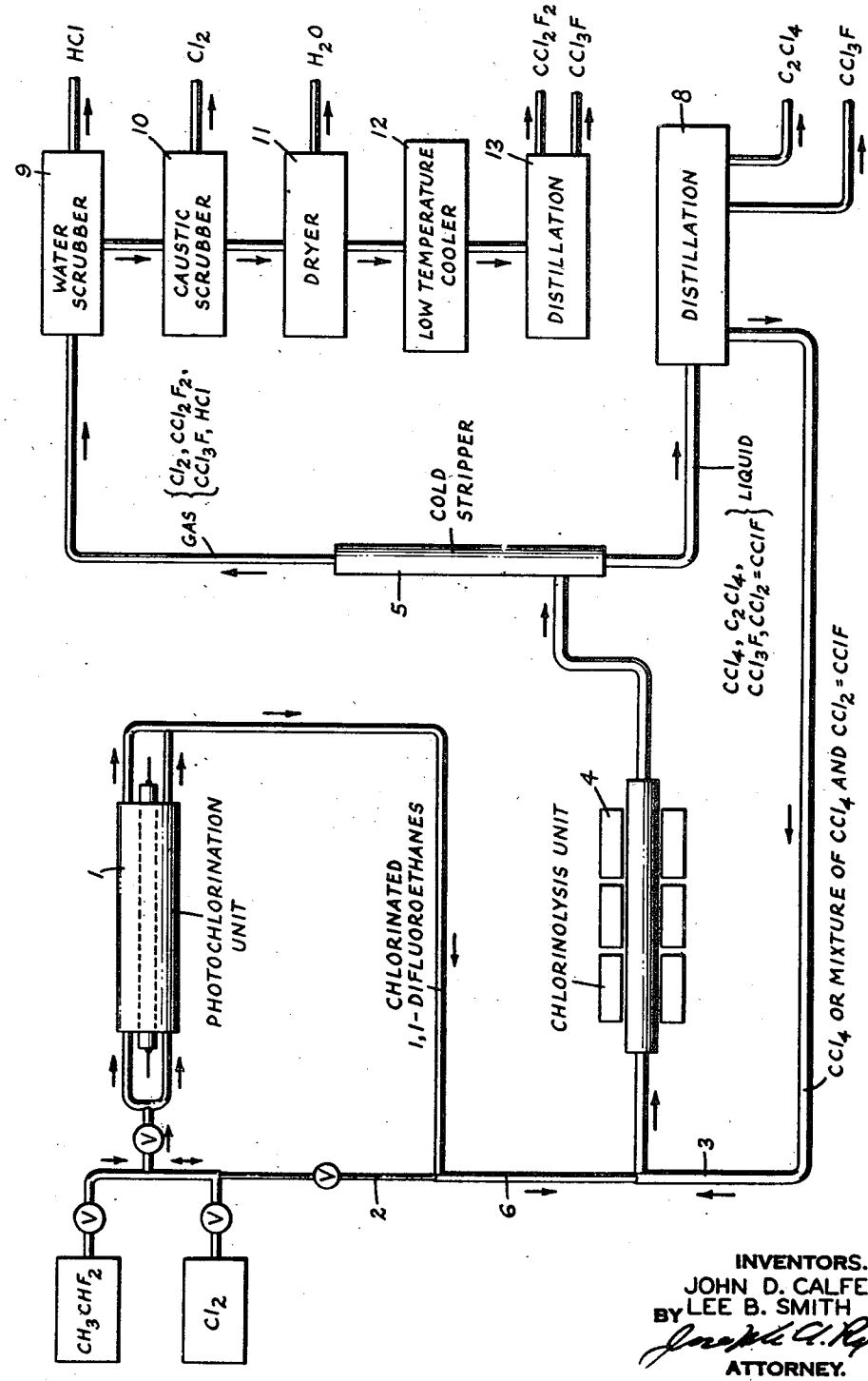

2,572,913

UNITED STATES PATENT OFFICE 2,572,913

MANUFACTURE OF FLUOROCHLORO-METHANES

John D. Calfee, Manhasset, N. Y., and Lee B. Smith, Woodbridge, N. J., assignors to Allied Chemical & Dye Corporation, New York, N. Y., a corporation of New York Application April 21, 1949, Serial No. 88,792

15 Claims. (Cl. 260—653)

This invention relates chiefly to the manufacture of dichlorodifluoromethane, $CCl_2F_2$, trichlorofluoromethane, $CCl_3F$, and tetrachloroethylene, $CCl_2=CCl_2$, by chlorinolysis (disunion of carbon atoms by the action of chlorine) of 1,1-difluoroethanes.

It has been proposed to produce $CCl_2F_2$ and $CCl_3F$ by a two-stage process comprising first subjecting a mixture of the 1,1-difluoroethane, ethylidene fluoride ($CH_3CHF_2$), and chlorine to the action of actinic radiation to produce at least monochlorinated 1,1-difluoroethanes such as $CH_2ClCHF_2$. In the second stage, the product mixture of the photochemical treatment and possibly additional amounts of chlorine, are subjected to pyrolysis, i. e., temperatures in the range 550°-950° C., thereby causing substantially exhaustive chlorination and disunion of the carbon atoms. The product of the second stage comprises $CCl_2F_2$ and $CCl_3F$ as primary sought-for products, $CCl_4$ and, in addition, some $C_2Cl_4$. As an alternative procedure for producing $CCl_2F_2$ and $CCl_3F$, ethylidene fluoride may be directly subjected to chlorinolysis, without any preliminary treatment with actinic radiation, under conditions relatively similar to those employed in the second stage of the previously mentioned procedure. The product mixture comprises $CCl_2F_2$, $CCl_3F$, $CCl_4$, and some $C_2Cl_4$. Other 1,1-difluoroethanes, such as chlorinated difluoroethanes, may be used as starting material with substantially similar results in which case the amount of chlorine added is modified to allow for the chlorine already present in the molecule. These operations are characteristically such that chlorine consumption and the amount of chlorine in the off-gas in some operations may be relatively high, e. g. 10% by volume.

The foregoing processes are decided improvements over prior art methods of producing dichlorodifluoromethane. However, in the proposed procedures, it would be desirable if possible to convert the carbon tetrachloride by-product to other product or products having greater commercial value, and to reduce the amount of free chlorine which appears in the off-gas from the chlorinolysis treatment, and thereby simplify purification procedures.

Particular objects of our present invention are to convert carbon tetrachloride produced by chlorinolysis of 1,1-difluoroethanes efficiently into other products of greater value and, further, to provide practical means for reducing the amount of chlorine in the off-gas without decreasing the yield of desired products or otherwise detrimentally affecting the process.

According to our invention the process of subjecting a mixture of a 1,1-difluoroethane and chlorine to pyrolysis conditions to obtain a product comprising $CCl_2F_2$, $CCl_3F$ and $CCl_4$ is modified by separating at least part of the $CCl_4$ from the product mixture and adding it to the difluoroethane-chlorine mixture before the latter is subjected to pyrolysis. A normal expectation of the effect of such procedure would be that the space velocity of the main process stream would have to be decreased and that the yield of desired products would be materially adversely affected. Further, it would be expected that any reaction that the recycled $CCl_4$ might undergo would disturb the thermal balance of the system. Surprisingly, we have found that no such disadvantages are attendant with recycling $CCl_4$ to chlorinolysis reactions. Further, as a more particular advantage of our process, we find, unexpectedly, that $CCl_4$ is largely converted to a more valuable product, $C_2Cl_4$. Thus, even though all of the $CCl_4$ produced is continuously separated from the product and returned to the chlorinolysis step, there is no excessive build-up of $CCl_4$ in the system. The $C_2Cl_4$ product obtained has greater commercial value and accordingly we normally separate the entire amount of $CCl_4$ from the product and add it as recycle material to the chlorinolysis reaction. However, our process is not limited to thus separating and recycling the entire amount of $CCl_4$ formed. It is within the scope of our invention to separate part only, of the $CCl_4$ for the recycling procedure. As will be apparent to those skilled in chemical technology, $CCl_4$ may be readily available in commercial operation from sources other than the chlorinolysis procedures described above. Hence, it may be desired to add $CCl_4$ from other sources to the chlorinolysis reaction and such operation is intended to be included within the scope of our invention.

The advantages of our invention enumerated above may be obtained when any 1,1-difluoroethane-chlorine mixture is subjected to pyrolysis to obtain a product mixture comprising $CCl_2F_2$, $CCl_3F$ and $CCl_4$. One embodiment of our invention comprises procedure in which $CH_3-CHF_2$ is subjected to such chlorinolysis procedure and $CCl_4$ recycled according to the methods described. According to a preferred embodiment of our invention, an at least monochlorinated 1,1-difluoroethane, e. g. $CH_3-CClF_2$, is the 1,1-difluoroethane employed as starting material. More preferably the intermediate product, comprising a substantial quantity of 1,1,1-difluorochloroethane, usually substantial quantities of more highly chlorinated materials, produced by subjecting the 1,1-difluoroethane-chlorine mixture to the action of actinic radiation is a starting material employed to obtain the marked advantages of our novel process. Our improved procedure, although not limited to continuous chlorinolysis operations, is advantageously applied thereto. Accordingly, we more preferably carry out our process in two steps comprising first continuously subjecting a mixture of $CH_3CHF_2$ and chlorine to the action of actinic radiation thereby to obtain the reaction mixture containing residual free chlorine and intermediate product comprising at least monochlorinated 1,1-difluoroethane, and second, continuously subjecting this reaction mixture to pyrolysis in the presence of chlorine to produce $CCl_2F_2$, $CCl_3F$ and $CCl_4$. $CCl_4$ is separated from this product and added to the reaction mixture before the latter is subjected to pyrolysis.

The latter preferred embodiment of our invention will be more clearly understood by referring to the attached Figure 1, which is a representation thereof in diagrammatic form. Chlorine and ethylidene fluoride, flowing from their respective containers, are mixed and caused to undergo reaction in the annular reaction space of the photochlorination unit 1. The gaseous product, consisting of chlorinated 1,1-difluoroethanes, such as 1,1,1-difluorochloroethane and some more highly chlorinated ethanes, and chlorine, may be fortified by further addition of chlorine through pipe 2. The recycle is added from pipe 3 and the mixture passes through chlorinolysis unit 4. The effluent product, comprising $CCl_2F_2$, $CCl_3F$, $CCl_4$, $C_2Cl_4$, HCl, and unreacted chlorine is passed through cold stripper 5, where the higher boiling materials $CCl_4$, $C_2Cl_4$, and some $CCl_3F$ are condensed. The $CCl_4$ is separated by distillation from this liquid product at 8 and is recycled to the chlorinolysis feed through pipe 3.

In case $CH_3CHF_2$ is subjected to chlorinolysis directly, without first undergoing photochlorination at 1, the $CH_3CHF_2$-chlorine mixture may be fed directly to chlorinolysis unit 4 through pipes 2 and 6. Product recovery at 5 and 8 and recycle procedure through pipe 3 is similar to that described above.

As previously indicated it is an object of our invention to decrease the chlorine in the product gas and thereby simplify purification procedures. However, if amounts of chlorine reactant employed are decreased substantially below certain values, the formation of appreciable amounts of the unsaturated material, $CCl_2=CClF$, results. This material boils at a temperature very close to boiling temperature of $CCl_4$. Such by-product formation causes loss of sought-for products and the difficulty of separation of this unsaturate from $CCl_4$ by fractional distillation. According to our present invention less amounts of initial chlorine may be employed without causing these effects. $CCl_4$ recycled to the chlorinolysis reaction decomposes to produce chlorine and the valuable product $C_2Cl_4$, the reaction probably proceeding as follows:

$$2CCl_4 \rightarrow CCl_2=CCl_2 + 2Cl_2$$

This chlorine of decomposition reacts with process material to give sought-for products, thus functioning in the same manner as free chlorine initially introduced into the reaction. Accordingly, the chlorine initially introduced into the reaction may be decreased. This, in turn, causes a decrease in the concentration of the residual chlorine in the gaseous mixture of products below possibly high values of e. g. 10% by volume. The feature of enabling the reduction in the chlorine feed to be made is a particular advantage of our present process.

A further important aspect of our discovery which is a particular feature of a preferred embodiment of our invention is that, when appreciable amounts of $CCl_2=CClF$ are formed and appear in the product, as is the case, for example, in processes in which the ratio of added chlorine to the 1,1-difluoroethane starting material is maintained at a low value, the $CCl_4$ need not be separated from the $CCl_2=CClF$ prior to recycling $CCl_4$ to the pyrolyzer. $CCl_2=CClF$ may be recycled from distillation unit 8 of Figure 1 through pipe 3 with the $CCl_4$. $CCl_2=CClF$ thus recycled is converted to $CCl_3F$ which is one of the primary sought-for products of the chlorinolysis process for producing $CCl_2F_2$. Since the principal disadvantageous effect of reducing chlorine concentration in the feed mixture is loss of sought-for products as the unsaturate, $CCl_2=CClF$, and difficulty of separation of the $CCl_4$ from this unsaturate, a further object and advantage of the invention now becomes apparent. In the light of our discovery that both $CCl_4$ and the unsaturate, heretofore considered as undesirable, may be recycled to the pyrolyzer to produce useful products, further reduction of chlorine concentration in original feed mixture may be effected without encountering the abovementioned disadvantage which was previously thought to be unavoidably connected with low chlorine inputs. Accordingly, in more preferred embodiments of our invention we separate $CCl_4$, $CCl_2=CClF$ mixture from the product of chlorinolysis of a 1,1-difluoroethane and add such mixture to process material to be subjected to chlorinolysis.

The material to be recycled may be separated from the chlorinolysis product in any suitable way, e. g. by condensation and by distillation of the condensate as in stripper 5 and still 8 of the drawing. The upper limit of the boiling range of the recycle fraction should be not substantially above about 85° C., which temperature limit includes substantially all $CCl_4$ present (B. P. plus 77° C.). A suitable lower limit of the boiling range is 63° C., since such a fraction would normally include substantially all of the unsaturate $CCl_2=CClF$ present (B. P. plus 71° C.). However, in practice, it may be found convenient to return as recycle to chlorinolysis certain amounts of $CCl_3F$ (B. P. plus 23.8° C.), which material passes through the chlorinolysis reactor substantially unaffected. In this case the lower limit of the boiling range of the recycle material may be about 15–20° C.

We have found further, as part of our discovery, that it is not necessary to subject the $CCl_4$, $CCl_2=CClF$ mixture to chlorinolysis conditions in the presence of other material in order to effect conversion of this unsaturate to $CCl_3F$. This mixture may, if desired, be treated separately in a reactor similar to chlorinolysis unit 4. It appears that the $CCl_4$ under these conditions decomposes to produce free chlorine as described above, which chlorine in turn attacks the unsaturate to effect chlorinolysis thereof and to produce the sought-for $CCl_3F$. Sufficient $CCl_4$ should be present in the mixture so separately pyrolyzed to produce chlorine in amount sufficient to effect the desired chlorinolysis of the $CCl_2=CClF$. If insufficient $CCl_4$ is present in the mixture separated from the chlorinolysis product, additional free chlorine may be added to the mixture prior to said chlorinolysis. Further, if it is desired to treat $CCl_2=CClF$ alone, this material may be pyrolyzed in the presence of sufficient chlorine to produce $CCl_3F$, the reaction conditions being those previously described for the chlorinolysis of 1,1-difluoroethanes.

We believe that the reaction of $CCl_2=CClF$ with chlorine to produce $CCl_3F$ takes place according to the following equation:

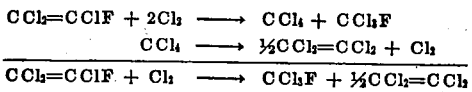

$$CCl_2=CClF + 2Cl_2 \longrightarrow CCl_4 + CCl_3F$$
$$CCl_4 \longrightarrow \tfrac{1}{2}CCl_2=CCl_2 + Cl_2$$
$$\overline{CCl_2=CClF + Cl_2 \longrightarrow CCl_3F + \tfrac{1}{2}CCl_2=CCl_2}$$

i. e., for each mol of $CCl_2=CClF$ decomposed (subjected to disunion of the C—C bond), 1 mol of $CCl_3F$ is theoretically formed, and assuming complete dimerization of $CCl_4$, there is also theoretically formed ½ mol of $CCl_2=CCl_2$. However, our invention is not intended to be limited by any theory of reaction.

Since $CCl_2F_2$ is the preferred main product of the reaction, at least sufficient chlorine is used to form this product in substantial amounts. In the $CCl_4$-recycling procedure, amounts of chlorine to be employed in any particular chlorinolysis operation will depend to some extent upon the operating conditions maintained and upon the particular 1,1-difluoroethane starting material fed to the chlorinolysis unit. In general, the amount of chlorine may be less than processes in which no $CCl_4$ is recycled. For example, when $CH_3CClF_2$ is used as chlorinolysis feed material, chlorine to $CH_3CClF_2$ ratios in the range 2.8:1 to 4.0:1, may be maintained. In the event that the starting material is a product of chlorination of $CH_3-CHF_2$ higher than $CH_3-CClF_2$, correspondingly lower amounts of chlorine may be employed in the recycling process of our invention. Ordinarily, when the material fed to the chlorinolysis unit is the product of the photochemical treatment of $CH_3-CHF_2$ described above, the range of ratios of chlorine to $CH_3-CHF_2$ employed in the overall photochemical and chlorinolysis operation according to the present invention may be 3.8:1 to 5.0:1. When $CH_2CHF_2$ is employed as starting material for the one step process referred to above, similar low ratios of chlorine to $CH_3-CHF_2$ may be utilized.

The temperatures which are maintained according to our improved chlorinolysis procedure are substantially the same as those employed for the reaction when no $CCl_4$ is recycled to the mixture undergoing chlorinolysis. This is an important advantage in our process because the recycled material can be added to the main process stream without necessitating or causing substantial changes in operating temperature. Broadly considered temperatures in the range 550°–950° C. may be employed, but a more preferred range is 650°–850° C.

It should be emphasized that, for a given operation, an outstanding and unexpected advantage of our process lies in the fact that recycled material (from pipe 3) may be added to the main process stream without decreasing the rate of throughput of said main process stream (pipe 6). In the recycle procedure, the yield of sought-for $CCl_2F_2$ remains substantially unchanged as compared with yields when no material is recycled. Accordingly, the space velocity which may be employed according to the present invention is the sum of the space velocity of the main process stream when there is no recycle plus the space velocity of the recycled material.

The process may be carried out in a tubular reactor (4) of suitable length, equipped at one end with pipe connections facilitating introduction into the reactor of the desired proportions of raw materials, and at the outlet end with a gas off-take pipe for conducting the exit gas to the product recovery system. The reactor is provided with an external heating jacket together with means for maintaining controlled temperatures within the reactor. The reaction preferably should be carried out in the absence of catalysts such as active carbon and compounds of silicon. Hence, the reactor is preferably made of a neutral or non-catalytic material such as graphite.

The exit gas from the step of chlorinolysis of the 1,1-difluoroethane and recycled $CCl_4$ comprises $CCl_2F_2$ (B. P. minus 30° C.), $CCl_3F$ (B. P. plus 23.8° C.), $CCl_4$ (B. P. plus 77° C.), $C_2Cl_4$ (B. P. plus 122° C.), plus HCl and some unreacted chlorine and may in addition, as previously indicated herein, also comprise $CCl_2=CClF$ (B. P. plus 71° C.). Such a gas may be treated in any suitable way to recover the desired products. For example, the gas stream may be passed through stripping apparatus 5 maintained at a temperature sufficiently low (e. g. minus 15° C.) to strip out high boiling materials, e. g. $CCl_4$, $C_2Cl_4$, possibly some $CCl_3F$ and any $CCl_2=CClF$ present, and then may be water-washed at 9 to remove most of the hydrochloric acid, washed with a mild NaOH solution at 10 to remove chlorine and the last traces of HCl, and finally dried at 11 as by use of calcium chloride or silica gel. The exit gas of the drying step comprises principally $CCl_2F_2$. If desired, such gas stream may be further cooled at 12 to condense $CCl_2F_2$ and $CCl_3F$, and the resulting liquor may be fractionated at 13 to recover $CCl_2F_2$ and $CCl_3F$ as products. The condensate obtained from stripper 5 plus the bottoms from still 13, may be distilled at 8 to separate and recover the $CCl_3F$, $C_2Cl_4$ and $CCl_4$. In the absence of $CCl_2=CClF$, the $CCl_4$ cut may be recovered in substantially pure form, or in the presence of $CCl_2=CClF$ a distillate mixture of $CCl_4$ and $CCl_2=CClF$ may be recovered. The $CCl_4$ or the $CCl_4$, $CCl_2=CClF$ mixture so distilled from the reaction product may be recycled through pipe 3 to subsequent chlorinolysis procedure. As heretofore indicated, if desired, the recycle cut may also include any $CCl_3F$ condensed in stripper 5.

For processes in which $CH_3=CClF_2$ is employed as starting material for the chlorinolysis procedure of our invention, such $CH_3-CClF_2$ may be prepared by methods other than actinic radiation as heretofore described. For example, methyl chloroform may be fluorinated using antimony trifluoride as the fluorinating agent to accomplish replacement of two of the chlorine atoms in the methyl chloroform by fluorine; similarly, methyl chloroform may be fluorinated using anhydrous hydrofluoric acid as fluorinating agent.

Following are examples illustrating the practice and advantages of our invention process and various phases thereof, the parts and percentages expressed being by weight:

Example 1

164 parts of ethylidene fluoride and chlorine in gaseous form were fed from their respective containers in mol ratio of 4.5 mols $Cl_2$ per mol $CH_3CHF_2$, intimately mixed and introduced into the stage 1 reactor which consisted of an annular space formed by the wall of a tubular fluorescent lamp and a cylindrical glass jacket. The gas mixture was passed through the reactor at about 170 space velocity-hour units while being subjected to light from the fluorescent lamp. 60 parts of recycle material, which material consisted of 35 weight per cent of $CCl_4$ and 65 weight per cent of $CCl_2=CClF$, were mixed with the off-gas from the reactor of stage 1 and the mixture was passed to the stage 2 reactor which consisted of a graphite tube of such length and diameter that the gases were passed through the reactor at space velocity of 500 S. V. H. The graphite tube was provided with a jacket whereby heat was applied and temperature maintained at about 800° C. The off-gas containing some residual free $Cl_2$ was passed upward through a packed externally cooled nickel pipe maintained at about minus 15° C. to strip out the high boiling materials $CCl_4$, $C_2Cl_4$, $CCl_2=CClF$, and some $CCl_3F$. Gas from the stripper, containing 4.76% $Cl_2$ was scrubbed with water to remove HCl, with alkali solution to remove excess chlorine and were dried and cooled sufficiently to liquefy $CCl_2F_2$ and any previously uncondensed $CCl_3F$ and condensate was collected in a cold trap. $CCl_2F_2$ and $CCl_3F$ were separated by distillation and recovered. The stripper condensate was distilled and $CCl_3F$, $C_2Cl_4$, individually, and a mixture of $CCl_4$ and $CCl_2=CClF$ were recovered. A small residue of higher boiling materials was also recovered. Products recovered: 226 parts $CCl_2F_2$, 116 parts $CCl_3F$, 143 parts $CCl_2=CCl_2$, 31 parts $CCl_4$ and 22 parts $CCl_2=CClF$. The $CCl_2F_2$ yield was substantially unchanged, while the $CCl_3F$ and $C_2Cl_4$ yields were substantially increased (illustrating the conversion of the by-products of $CCl_2=CClF$ and $CCl_4$ to sought-for $CCl_3F$ and $C_2Cl_4$, respectively) as compared with procedures in which no material was recycled.

*Example 2*

A liquid product from chlorinolysis of $CH_3CClF_2$ was distilled, and a fraction boiling in the range 65–83° C. was recovered. This fraction was found by analysis to contain approximately 30% by weight $CCl_4$, 65% $CCl_2=CClF$, the balance consisting of other halogenated hydrocarbons. 170 parts of said fraction (52 parts of $CCl_4$ and 111 parts of $CCl_2=CClF$) was mixed with about 35 parts of free chlorine and the gaseous mixture fed continuously to a graphite tube reactor at the rate of 125 space velocity hour units. The temperature of the reactor was maintained at about 775° C. The product off-gas was removed at the exit of the reactor, residual free chlorine and HCl was removed therefrom and the product mixture containing $CCl_3F$, $CCl_4$, $C_2Cl_4$, $CCl_2=CClF$ and other fluorinated products was collected and distilled. Products recovered: 53 parts $CCl_3F$, 8 parts $CCl_4$, 27 parts $CCl_2=CClF$, 65 parts $C_2Cl_4$, 5 parts $CCl_2F_2$ and 9 parts $CFCl_2CCl_3$. Of the total $CCl_2=CClF$ which disappeared, 71% was accounted for by formation of $CCl_3F$ (based on the theoretical formation of 1 mol $CCl_3F$ per mole $CCl_2=CClF$ consumed). On the basis of formation of ½ mol of $CCl_2=CCl_2$ for each mol of $CCl_4$ consumed and each mole of $CCl_2=CClF$ decomposed (i. e., C—C bond split), the above data showed that substantially all of $C_2Cl_4$ which appeared in the product was accounted for by the disappearance of $CCl_4$ and $CCl_2=CClF$.

*Example 3*

50 parts per hour of ethylidene fluoride, and chlorine in amount to afford 4.4 mols of $Cl_2$ per mol of $CH_3CHF_2$ were fed continuously in gaseous form from their respective containers, intimately mixed and introduced into a reactor (stage 1) which consisted of a chamber illuminated by fluorescent lamps. The gas mixture was passed through the reactor at about 840 space velocity-hour units while being subjected to light from said lamps. To the off-gas from stage 1, containing $CH_3CClF_2$ and other more highly chlorinated fluoroethanes, there was added continuously 42.1 parts per hour of recycle material separated by distillation from the product of stage 2. The recycle material consisted of 38.7% $CCl_4$, 37.8% $CCl_2=CClF$, 22.5% $CCl_3F$ and the balance $C_2Cl_4$ and other high boiling material. The mixture of feed and recycle was passed to the stage 2 reactor which consisted of a graphite tube of such length and diameter that the gases were passed through the reactor at space velocity of 313 S. V. H. The graphite tube was provided with a heating jacket, and temperature of the chlorinolysis reaction was maintained at about 793° C. The off-gas containing some residual free $Cl_2$ was passed upward through a packed externally cooled pipe, maintained at about minus 25° C. to strip out the high boiling materials, $CCl_4$, $C_2Cl_4$, $CCl_2=CClF$ and some $CCl_3F$. Gases from the stripper containing 4.3 weight per cent $Cl_2$ were scrubbed with water to remove HCl, with alkali solution to remove excess chlorine and were dried and cooled sufficiently to liquefy $CCl_2F_2$ and any previously uncondensed $CCl_3F$. $CCl_2F_2$ and $CCl_3F$ were separated by distillation and recovered. A small amount of $CCl_4$ was also recovered. The stripper condensate was distilled and a fraction containing $CCl_4$, $CCl_2=CClF$ and $CCl_3F$, was separated and returned as recycle with the feed to step 2 as indicated above. The higher boiling fraction remaining in the still, consisting predominantly of $C_2Cl_4$ and a small amount of other high boilers and $CCl_4$, was recovered. Products recovered (per hour): 69.8 parts $CCl_2F_2$, 40.4 parts $CCl_3F$, 48.8 parts $C_2Cl_4$, and 2.3 parts $CCl_4$. The $CCl_2F_2$ yield was substantially unchanged while the yields of $C_2Cl_4$ and $CCl_3F$ were increased substantially as compared with chlorinolysis procedure in which the reactants and reaction conditions were substantially similar but no material was recycled to the stage 2 reactor. Further, these improvements were obtained notwithstanding the use of an appreciably reduced chlorine input. The foregoing results illustrate the conversion of recycled $CCl_4$ and $CCl_2=CClF$ to more valuable material as hereinbefore described, and also the feasibility of reducing chlorine input.

*Example 4*

273 parts of ethylidene fluoride, and chlorine in gaseous form were fed from their respective containers in mol ratio of 4.5 mols $Cl_2$ per mol $CH_3CHF_2$, intimately mixed and introduced into a reactor (stage 1) which consisted of the annular space formed by the wall of a tubular fluorescent lamp and a cylindrical glass jacket. The gas mixture was passed through the reactor at about 170 space velocity-hour units while being subjected to light from said lamp. 100 parts of $CCl_4$ were mixed with the off-gases from the reactor of stage 1, containing $CH_3-CClF_2$, and the mixture was passed to the stage 2 reactor which consisted of a graphite tube of such length and diameter that the gases were passed through the reactor at space velocity of 500 S. V. H. The graphite tube was provided with a jacket whereby heat was applied and temperature maintained at about 800° C. The off-gas containing some residual free $Cl_2$ was passed upward through a packed externally cooled nickel pipe, maintained at about minus 15° C. to strip out the high boiling materials $CCl_4$, $C_2Cl_4$, $CCl_2=CClF$ and some $CCl_3F$. Gases from the stripper containing 6.1 weight per cent $Cl_2$ were scrubbed with water to remove HCl, with alkali solution to remove excess chlorine and were dried and cooled sufficiently to liquefy $CCl_2F_2$ and any previously uncondensed $CCl_3F$. $CCl_2F_2$ and $CCl_3F$ were separated by distillation and recovered. The stripper condensate was distilled, and $CCl_3F$, $C_2Cl_4$, individually, and a mixture of $CCl_4$ and $CCl_2=CClF$ were recovered. A small residue of higher boiling materials remained in the still. 202 parts $C_2Cl_4$, 42 parts $CCl_4$, and 12 parts $CCl_2=CClF$ were recovered. Even though $CCl_4$ was formed during the chlorinolysis reaction, as above described, it will be noted that the amount of $CCl_4$ recovered was substantially smaller than that fed to the reactor. This illustrates the facility of conversion of $CCl_4$ to other materials as hereinbefore described.

Example 5

165 parts of ethylidene fluoride, and chlorine in gaseous form were fed from their respective containers in mol ratio of 4.5 mols $Cl_2$ per mol $CH_3CHF_2$, intimately mixed and introduced into the stage 1 reactor described in Example 4. The gas mixture was passed through the reactor at about 170 space velocity-hour units while being subjected to light from the fluorescent lamp. 60 parts of recycle material, which material consisted of 80 weight per cent of $CCl_4$ and 20 weight per cent of $CCl_2=CClF$, were mixed with the off-gas from the reactor of stage 1 and the mixture was passed through the stage 2 reactor of Example 4 at space velocity of 500 S. V. H. The temperature in the tube was maintained at about 800° C. The off-gas, containing some residual free $Cl_2$, was passed through a stripper, as described in Example 4, and the gas from the stripper was scrubbed, dried, cooled sufficiently to liquefy $CCl_2F_2$ and any previously uncondensed $CCl_3F$ and condensate was collected in a cold trap. The stripper and cold trap condensates were fractionally distilled as described in Example 4 to recover $CCl_2F_2$, $CCl_3F$, and $C_2Cl_4$ individually, and a mixture of $CCl_4$ and $$CCl_2=CClF$$

A small residue of higher boiling materials was recovered. Products recovered: 230 parts $CCl_2F_2$, 102 parts $CCl_3F$, 140 parts $CCl_2=CCl_2$, 36.1 parts $CCl_4$, and 15.4 parts $CCl_2=CClF$. The $CCl_2F_2$ yield was substantially unchanged, while the $CCl_3F$ yield was substantially increased (illustrating the conversion of the by-product $CCl_2=CClF$ to $CCl_3F$) as compared with procedures in which no material was recycled. Notwithstanding formation of $CCl_4$ in the reactor, it will be noted that the amount of $CCl_4$ present in the product was substantially smaller than that returned with the recycle, thus illustrating the conversion of $CCl_4$ to other materials.

We claim:

1. In the process of pyrolyzing a mixture of a 1,1-difluoroethane and chlorine to form a reaction product comprising $CCl_2F_2$, $CCl_3F$ and $CCl_4$, the step which comprises adding $CCl_4$ to said mixture before subjecting the same to said pyrolysis.

2. In the process of pyrolyzing a mixture of a 1,1-difluoroethane and chlorine to form a reaction product comprising $CCl_2F_2$, $CCl_3F$, and $CCl_4$, the improvement which comprises separating at least part of said $CCl_4$ from said product, and adding said separated $CCl_4$ to said mixture before subjecting the same to said pyrolysis.

3. In the process of pyrolyzing a 1,1-difluoroethane in the presence of chlorine to form a reaction product comprising $CCl_2F_2$, $CCl_3F$, $CCl_4$ and $CCl_2=CClF$, the improvement which comprises separating a mixture of at least part of said $CCl_4$ and said $CCl_2=CClF$ from said product, and adding said mixture to said 1,1-difluoroethane before subjecting the same to said pyrolysis.

4. In the process of pyrolyzing a 1,1-difluoroethane in the presence of chlorine to form a reaction product comprising $CCl_2F_2$, $CCl_3F$ and $CCl_4$, the improvement which comprises separating from said reaction product a mixture equivalent to that boiling substantially in the range of 63–85° C. at substantially atmospheric pressure, and adding said mixture to said 1,1-difluoroethane before subjecting the same to said pyrolysis.

5. The process which comprises pyrolyzing a mixture of a 1,1-difluoroethane and chlorine in amount at least sufficient to form $CCl_2F_2$ at temperature in the range of 550–950° C. to form a reaction product comprising $CCl_2F_2$, $CCl_3F$, $CCl_4$ and $CCl_2=CClF$, separating from said product at least part of said $CCl_4$, and adding said separated $CCl_4$ to a further quantity of said mixture before subjecting the same to said pyrolysis.

6. The process which comprises pyrolyzing a mixture of a 1,1-difluoroethane and chlorine in amount at least sufficient to form $CCl_2F_2$ at temperature in the range of 550–950° C. to from a reaction product comprising $CCl_2F_2$, $CCl_3F$, $CCl_4$ and $CCl_2=CClF$, separating from said product a mixture of at least part of said $CCl_4$ and said $CCl_2=CClF$, and adding such mixture to a further quantity of said first mentioned mixture before subjecting the same to said pyrolysis.

7. The process which comprises pyrolyzing a mixture of a 1,1-difluoroethane and chlorine in amount at least sufficient to form $CCl_2F_2$ at temperature in the range of 550–950° C. to form a reaction product comprising $CCl_2F_2$, $CCl_3F$, $CCl_4$ and $CCl_2=CClF$, separating from said product a mixture equivalent to that boiling substantially in the range of 63–85° C. at substantially atmospheric pressure, and adding such mixture to a further quantity of said first mentioned mixture before subjecting the same to said pyrolysis.

8. In the process of pyrolyzing a mixture of an at least monochlorinated 1,1,-difluoroethane and chlorine to form a reaction product comprising $CCl_2F_2$, $CCl_3F$ and $CCl_4$, the improvement which comprises separating at least part of said $CCl_4$ from said reaction product, and adding said separated $CCl_4$ to said mixture before subjecting the same to said pyrolysis.

9. The process which comprises pyrolyzing a mixture of an at least monochlorinated 1,1-difluoroethane and chlorine in amount at least sufficient to form $CCl_2F_2$ at temperature in the range of 550–950° C. to form a reaction product comprising $CCl_2F_2$, $CCl_3F$, $CCl_4$ and $CCl_2=CClF$, separating from said product a mixture equivalent to that boiling substantially in the range of 63–85° C. at substantially atmospheric pressure, and adding such mixture to a further quantity of said first mentioned mixture before subjecting the same to said pyrolysis.

10. The process which comprises actinically reacting $CH_3CHF_2$ and chlorine, in amount at least sufficient to form $CCl_2F_2$, to form a mixture comprising at least monochlorinated $CH_3CHF_2$ and residual free $Cl_2$, pyrolyzing said mixture at temperature in the range of 550–590° C. to form a reaction product comprising $CCl_2F_2$, $CCl_3F$ and $CCl_4$, separating at least part of said $CCl_4$ from said product, and adding said separated $CCl_4$ to a further quantity of said mixture before subjecting the same to said pyrolysis.

11. The process which comprises subjecting to actinic radiation a mixture of $CH_3CHF_2$ and sufficient chlorine to ultimately form dichlorodifluoromethane under conditions to form an intermediate reaction mixture containing residual free chlorine and at least monochlorinated ethylidene fluoride, heating said intermediate mixture at temperature in the range of 550–950° C. in the presence of said residual chlorine to thereby form a reaction product comprising $CCl_2F_2$, $CCl_3F$, $CCl_4$ and $CCl_2=CClF$, separating from said reaction product a mixture of at least part of said $CCl_4$ and said $CCl_2=CClF$, and adding such mixture to said intermediate mixture before subjecting the same to said heating.

12. The process which comprises subjecting to actinic radiation a mixture of $CH_3CHF_2$ and sufficient chlorine to ultimately form dichlorodifluoromethane under conditions to form an intermediate reaction mixture containing residual free chlorine and at least monochlorinated ethylidene fluoride, heating said intermediate mixture at temperature in the range of 650–850° C. in the presence of said residual chlorine to thereby form a reaction product comprising $CCl_2F_2$, $CCl_3F$, $CCl_4$ and $CCl_2=CClF$, the total amount of chlorine utilized in the radiation and heat steps being in the range of about 3.8 to 5.0 mols per mol of $CH_3CHF_2$, separating from said reaction product a mixture equivalent to that boiling substantially in the range of 63–85° C. at substantially atmospheric pressure, and adding such mixture to said intermediate mixture before subjecting the same to said heating.

13. The process which comprises subjecting $CCl_2=CClF$ to a temperature in the range 550° to 950° C. in the presence of sufficient $Cl_2$ to form $CCl_3F$.

14. The process which comprises subjecting $CCl_2=CClF$ to a temperature in the range 650° to 850° C. in the presence of sufficient $Cl_2$ to form $CCl_3F$ for a time sufficient to form a substantial quantity of $CCl_3F$.

15. The process which comprises subjecting a mixture of $CCl_2=CClF$, $CCl_4$ and $Cl_2$ to a temperature in the range 650° to 850° C., the aggregate amount of said $CCl_4$ and $Cl_2$ being sufficient to cause the production of a substantial amount of $CCl_3F$, for a time sufficient to form a substantial quantity of $CCl_3F$.

JOHN D. CALFEE.
LEE B. SMITH.

REFERENCES CITED

The following references are of record in the file of this patent:

UNITED STATES PATENTS

| Number | Name | Date |
|---|---|---|
| 2,417,059 | Calfee et al. | Mar. 11, 1947 |
| 2,442,324 | Heitz et al. | May 25, 1948 |
| 2,459,767 | Calfee et al. | Jan. 18, 1949 |
| 2,469,290 | Calfee et al. | May 3, 1949 |